(12) United States Patent
Pogodin

(10) Patent No.: US 8,117,192 B1
(45) Date of Patent: Feb. 14, 2012

(54) COMPUTERIZED INFORMATION SYSTEM FOR CREATING PATENT DATA SUMMARIES AND METHOD THEREFOR

(76) Inventor: Pavel Pogodin, San Mateo, CA (US)

(*) Notice: Subject to any disclaimer, the term of this patent is extended or adjusted under 35 U.S.C. 154(b) by 769 days.

(21) Appl. No.: 11/182,577

(22) Filed: Jul. 14, 2005

(51) Int. Cl.
*G06F 7/00* (2006.01)
*G06F 17/30* (2006.01)

(52) U.S. Cl. .................................. 707/722; 707/924

(58) Field of Classification Search ............ 707/102
See application file for complete search history.

(56) References Cited

U.S. PATENT DOCUMENTS

| | | | | |
|---|---|---|---|---|
| 5,991,751 A * | 11/1999 | Rivette et al. | ........................ | 1/1 |
| 6,205,456 B1 * | 3/2001 | Nakao | ............................ | 715/531 |
| 6,334,133 B1 * | 12/2001 | Thompson et al. | ........ | 707/104.1 |
| 6,675,159 B1 * | 1/2004 | Lin et al. | ................................ | 1/1 |
| 7,233,885 B1 * | 6/2007 | Larabee et al. | .................... | 703/1 |

OTHER PUBLICATIONS

Unknown, User Manual for the Examiners Automated Search Tool (EAST), Jul. 22, 1999, Computer Sciences Corporation, pp. Title, 3-2, 3-4, 5-19, 6-12, 6-22, 6-31, 6-37, 6-45, Fig 7-1.*
Unknown, Quick Reference Guide for West and East, Jun. 5, 2010 (summarizing information from Dec. 2003), Search and Information Resources Administration.*
Unknown, EAST 1.3: New Features, Feb. 2003, Search and Information Resources Administration, HTML Viewer.*
esp@cenet, verified Apr. 2004 from archive.org, European Patent Office, http://web.archive.org/web/20040401232739/http://www.espacenet.com/index.en.htm.*
Searching Patents, Mar. 2001, US Patent and Trademark Office, vol. XIII No. 3.*
SQL Joins, date verified as of Aug. 17, 2000 via Wayback Machine, w3schools.com, http://replay.waybackmachine.org/20000817082557/http://www.w3schools.com/sql/sql_join.asp.*

* cited by examiner

*Primary Examiner* — Pierre Vital
*Assistant Examiner* — Jason Liao
(74) *Attorney, Agent, or Firm* — Pavel I. Pogodin, Esq.

(57) ABSTRACT

A computerized system and method for generating patent data summary reports for a target entity identified by the user. The information system contains a database containing patent document records. After a user selects the target entity, the system issues a query to the database to identify all entities having a association with patent documents associated with the specified target entity. For example, the user may wish to receive a report on all the clients of a specific attorney. The system would search the database to locate all assignees of all patents prosecuted by that attorney and return a ranked list of such assignees to the user. Optionally, the system may generate a graphical representation of the information in the report and provide it to the user. The report provided to the user may be interactive in a sense that various items of information within the report may be connected by way of links to additional reports with more specific information on those particular items. Additionally, the system may automatically update the patent document database with new records as they become available.

20 Claims, 14 Drawing Sheets

| Patent No | Filing Date | Issue Date | Assignee | Attorney | Class/Subclass |
|---|---|---|---|---|---|
| ⋮ ⋮ | ⋮ ⋮ | ⋮ ⋮ | ⋮ ⋮ | ⋮ ⋮ | ⋮ ⋮ |

| Patent No. | Inventor Name | Inventor City | Inventor State |
|---|---|---|---|
| ⋮ ⋮ | ⋮ ⋮ | ⋮ ⋮ | ⋮ ⋮ |

Type the first few letters (at least 3) of your law firm name. Because of misspellings of names on some patents, it is preferred to enter only a portion of the name.

e.g. "Lyo" or "Lyon" or "Lyon Lyon"

Reset Form | Continue >>

Fig. 3b.

The items below match your input. Select ALL spellings of your law firm's name:

| Select | Firm Name | Number of Patents |
|---|---|---|
| ☐ | Sughrue Mion PLLC | 11003 |
| ☐ | Sughrue Mion Zinn Macpeak Seas PLLC | 94 |
| ☐ | Sughrue Mion LLP | 19 |
| ☐ | Sughrue Mion Zinn MacPeak Seas LLP | 13 |
| ☐ | Sughure Mion PLLC | 8 |
| ☑ | Sughrue Mion Zinn MacPeak Seas | 6 |
| ☑ | Sugrue Mion PLLC | 5 |
| ☐ | Sughrue Mion PPLC | 4 |
| ☐ | Sughrue Mion Zinn Macpeak | 3 |
| ☐ | Sughue Mion PLLC | 3 |
| ☐ | Sughrue Mion PLC | 2 |
| ☑ | Sugrue Mion Zinn Macpeak Seas | 1 |

Reset Form | Continue >>

Fig. 3c.

Sughrue Mion PLLC Top Clients

| | |
|---|---|
| Total Patents Procured In 2004 | 3637 |
| Total Patents Procured In 2003 | 3358 |
| Total Patents Procured In 2002 | 3301 |
| Change 2003-2004 | +279 |
| % Change 2003-2004 | +8.3% |
| Change 2002-2003 | +57 |
| % Change 2002-2003 | +1.7% |

| Rank | Client's Name | Patents Procured For Client in 2004 | Patents Procured For Client in 2003 | Patents Procured For Client in 2002 | Change 2003-2004 | % Change 2003-2004 | Change 2002-2003 | % Change 2002-2003 |
|---|---|---|---|---|---|---|---|---|
| 1 | Fuji Photo Film Co Ltd | 700 | 485 | 399 | +215 | +44.3% | +86 | +21.6% |
| 2 | Mitsubishi Denki Kabushiki Kaisha | 265 | 203 | 238 | +62 | +30.5% | -35 | -14.7% |
| 3 | Alcatel | 231 | 235 | 235 | -4 | -1.7% | 0 | 0% |

Page 1    Next Page >>

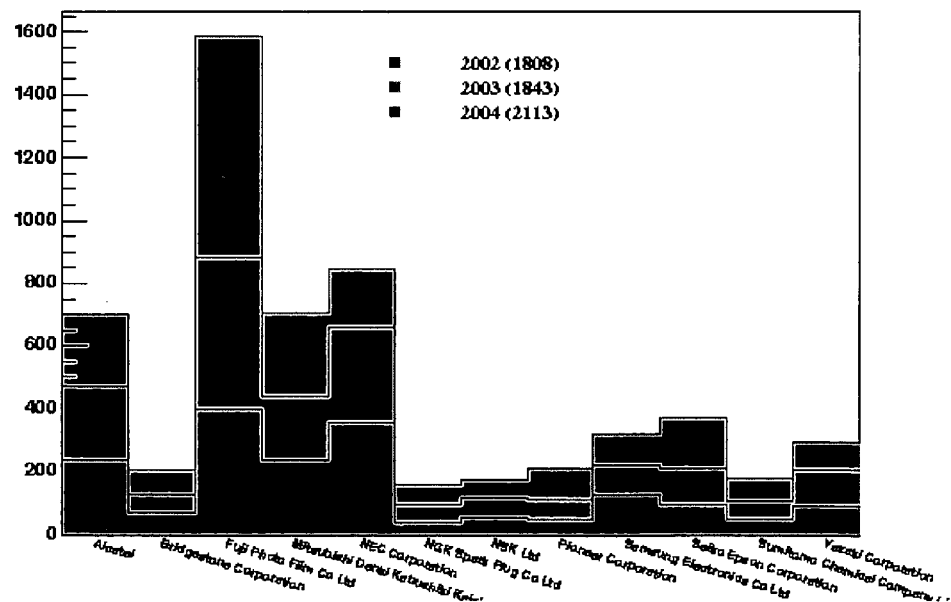

Fig. 4b.

Google Inc Top Outside Counsel

| | |
|---|---|
| Total Patents Procured In 2005 | <u>4</u> |
| Total Patents Procured In 2004 | <u>3</u> |
| Total Patents Procured In 2003 | <u>4</u> |
| Total Patents Procured In 2002 | 0 |
| Change 2004-2005 | +1 |
| % Change 2004-2005 | +33.3% |
| Change 2003-2004 | -1 |
| % Change 2003-2004 | -25% |
| Change 2002-2003 | +4 |
| % Change 2002-2003 | |

| Rank | Firms's Name | Patents Procured in 2004 | Patents Procured in 2003 | Patents Procured in 2002 | Change 2003-2004 | % Change 2003-2004 | Change 2002-2003 | % Change 2002-2003 |
|---|---|---|---|---|---|---|---|---|
| 1 | Harrity Snyder LLP | <u>3</u> | <u>1</u> | 0 | +2 | +200% | +1 | + |
| 2 | Straub Pokotylo | 0 | <u>3</u> | 0 | -3 | -100% | +3 | + |

Page 1      Next Page >>

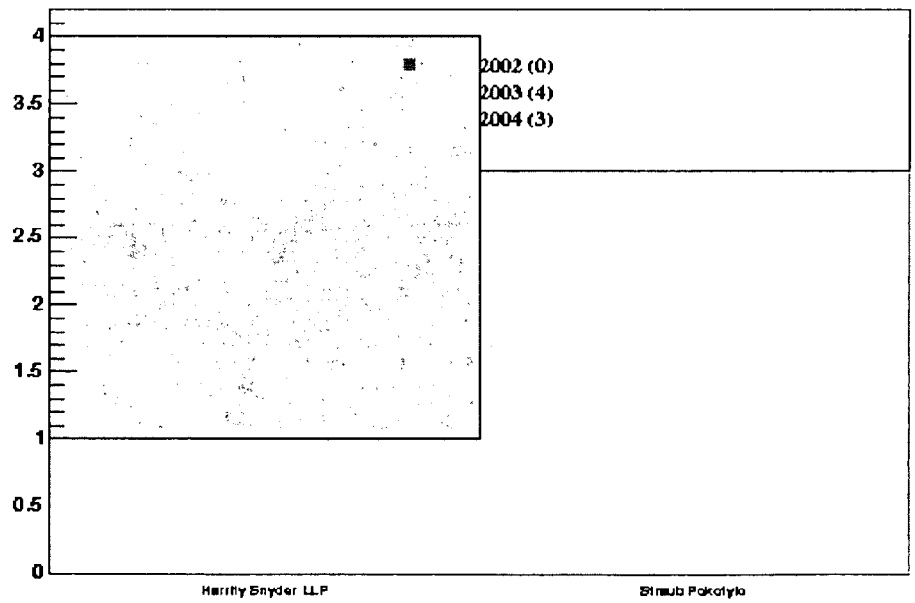

Fig. 5b.

Google Inc Top Inventors

| Rank | Inventor | City | State | Country | Patents Issued in 2002-2005 |
|---|---|---|---|---|---|
| 1 | Sergey Brin | Palo Alto | CA | US | 3 |
| 2 | Benjamin Thomas Smith | Mountain View | CA | US | 3 |
| 3 | Krishna Bharat | Santa Clara | CA | US | 2 |
| 4 | Christopher D. Manning | Palo Alto | CA | US | 2 |
| 5 | William H. Whitted | Palo Alto | CA | US | 2 |
| 6 | Sanjay Ghemawat | Mountain View | CA | US | 2 |
| 7 | William Pugh | Kensington | MD | US | 1 |
| 8 | Kin Lun Law | Redwood City | CA | US | 1 |
| 9 | Benedict Gomes | Berkeley | CA | US | 1 |
| 10 | Georges R. Harik | Mountain View | CA | US | 1 |
| 11 | David L. desJardins | Mountain View | CA | US | 1 |
| 12 | Amit J. Patel | Cupertino | CA | US | 1 |
| 13 | Monika H. Henzinger | Menlo Park | CA | US | 1 |

Page 1　　　　Next page >>

Fig. 6b.

Google Inc US Patent Class Data

| Rank | US Patent Class | Patents Procured in Class in 2004 | Patents Procured in Class in 2003 | Patents Procured in Class in 2002 | Change 2003-2004 | % Change 2003-2004 | Change 2002-2003 | % Change 2002-2003 |
|---|---|---|---|---|---|---|---|---|
| 1 | 707 | 1 | 3 | 0 | -2 | -66.7% | +3 | + |
| 2 | 709 | 1 | 1 | 0 | 0 | 0% | +1 | + |
| 3 | 715 | 1 | 0 | 0 | +1 | + | 0 | + |

Page 1          Next Page >>

Fig. 7b.

COMPUTERIZED INFORMATION SYSTEM FOR CREATING PATENT DATA SUMMARIES AND METHOD THEREFOR

FIELD OF THE INVENTION

The present invention relates to the summarizing, organizing and visualizing data and more specifically to creating easily readable comprehensive patent data summaries.

DESCRIPTION OF THE RELATED ART

Many private companies and government organizations offer Internet access to a wide variety of patent information. For example, patent data is available from the United States Trademark Office website www.uspto.gov. Using such information services, users may retrieve detailed information on each issued patent and perform simple searches of the patent database.

Unfortunately, the patent data that is presently available over the Internet is not easily organized and summarized. For example, if a user desires to generate a list of all clients of a specific patent law firm ranked by the number of the issued patents, the user would have to first perform a search for all the patents obtained by the law firm, then determine the assignee of each such patent, then count all patents issued to each separate assignee and subsequently rank the found patent assignees based on the total number of issued patents. The existing patent information services such as U.S. Patent and Trademark Office website do not allow automation of the above process and do not provide means for easily creating customizable patent data summary reports. In addition, there is no easy way to generate a graphical representation of the patent information.

Thus, the existing patent information services fail to provide patent data that is easily organized and summarized. The existing techniques also fail to provide the ability to visualize comprehensive patent data summaries in a graphics form for viewing by users via the Internet.

SUMMARY OF THE INVENTION

The present invention is directed to methods and systems that substantially obviate one or more of the above and other problems associated with conventional techniques for generating flexible patent data reports and summaries.

One aspect of the inventive concept is a method, computer programming product and a computer system for generating a comprehensive patent data summary report on a target entity specified by the user. The target entity having an association with one or more patent documents.

Another aspect of the inventive concept is a method, computer programming product and a computer system for generating interactive patent data summary reports.

Yet another aspect of the inventive concept is a method, computer programming product and a computer system for automatically updating the database with new patent document records as such new records become available.

A further aspect of the inventive concept is a method, computer programming product and a computer system for providing generated reports with graphical representation of the information contained therein;

Yet further aspect of the inventive concept is a method, computer programming product and a computer system for providing generated reports via a computer network to a user.

Yet further aspect of the inventive concept is a method, computer programming product and a computer system for selecting a proper entity for purposes of generating patent data summary reports.

Yet further aspect of the inventive concept is a method, computer programming product and a computer system for generating patent data summary reports having a report caching and logging capability.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 2a and 2b illustrate exemplary table structure of a database in an embodiment of the inventive information system;

FIGS. 3b and 3c illustrate the operation of an exemplary embodiment of an inventive algorithm for identifying proper entity;

FIG. 4b illustrates an exemplary embodiment of a report generated by an inventive algorithm;

FIG. 5b illustrates another exemplary embodiment of a report generated by an inventive algorithm;

FIG. 6b illustrates yet another exemplary embodiment of a report generated by an inventive algorithm;

FIG. 7b illustrates yet another exemplary embodiment of a report generated by an inventive algorithm;

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

The inventor recognized that would have been advantageous to provide a computer information system that would create instant comprehensive custom patent data summaries capable of being presented in an easily readable graphics form to a requesting user.

Figure 1:
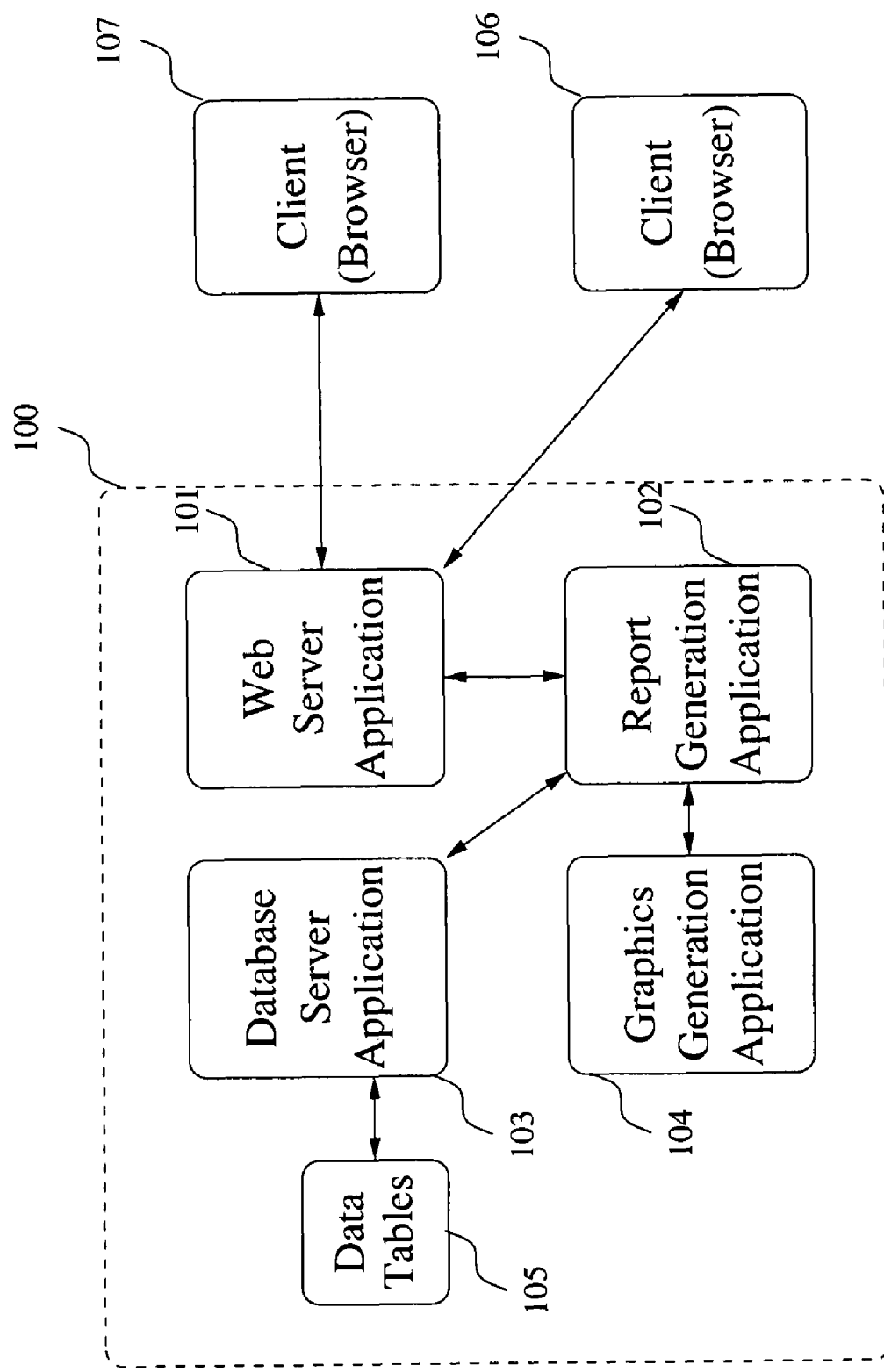
FIG. 1 depicts a conceptual block-diagram of an exemplary embodiment of the inventive computerized information system.

FIG. 1 illustrates an exemplary embodiment of the inventive computerized patent information system. The embodiment of the system architecture shown in FIG. 1 generally follows the well-know client-server model. As shown in the FIG. 1, the exemplary system is implemented on a computer platform 100, which hosts a web server application 101, a report generation application 102, a database server 103 with database tables 105 and a graphics generation application 104. In an alternative embodiment, the information system is implemented on two or more hardware server platforms. As will be appreciated by persons of skill in the art, use of multiple server platforms would facilitate system's availability, improved network traffic handling capacity and fault tolerance. For example, the database server may be implemented on a separate computer platform and provide data to a client application (for example, report generation application) via a network connection.

To view patent data summaries generated by the inventive information system, a user utilizes clients 106 or 107, which access the inventive system via a computer network. As will be appreciated by those of skill in the art, clients 106 and 107 may be located anywhere on a local area network (LAN), wide-area network (WAN), or the Internet and may be implemented using a variety of hardware and software. The only requirement to clients 106 and 107 is that they have the ability to convey the received data to the user and have network connectivity with the inventive system 100. The clients may also be able to relay to the inventive computer system via network the information input by the user. One exemplary implementation of a client is a desktop computer running a web browser application such as Microsoft Internet Explorer, Netscape Navigator or Mozilla Firefox. Another exemplary embodiment of the client is a handheld computer or a personal digital assistant, such as Treo network-enabled PDA, manufactured and distributed by Palm Inc. Clients may operate under a variety of operating systems such as Microsoft Windows, MacOS, Linux, FreeBSD, PalmOS, etc., and may utilize a variety of computer hardware and software.

The clients 106 and 107 connect to the inventive system via network by means of a web server/application server 101 running on the computer platform 100, which handles the network requests from the clients 106 and 107 and returns information responsive to the received requests. The computer platform 100 shown in FIG. 1 may operate under a variety of operating systems such as Unix, Windows, FreeBSD, MacOS, Linux, etc. Also, various computer hardware may be utilized in implementing the platform 100, as described below.

The database server application 103 manages the patent data stored in database tables 105. Specifically, the database server 103 is responsible for inserting data records into the database tables, deleting records, organizing, indexing and optimizing stored data as well as performing various queries on the data tables under the direction of the report generating application 102.

The database server application 103 may be of any suitable type, including Oracle, Mycrosoft's SQLServer, IBM DB2, MySQL, etc. The database system 103/105 may be of relational or non-relational type. Operation of such database systems is well known in the art. The web/application server 101 provides the interface between the network clients 106 and 107 and the report generation application 102 running on the computer platform 100. It may be also of any known variety, including Apache 1.x or 2.x, iPlanet, Microsoft Windows Server, etc.

An exemplary user session involving the inventive information system may include a request for a patent information report being initiated by a user utilizing clients 106 or 107, the request being first received by the web/application server 101. The request received from the client includes information on the report being requested. Such information may be provided by the user at the time of the request and may include the type of the report (for example, Attorney/Agent or Assignee report), the name of the target entity (for example law firm), etc. After the receipt of the request, the web/application server 101 invokes the report generation application 102 and passes it the parameters provided by the user.

The report generation application proceeds with generating the report requested by the user. To this end, the report generation application issues one or more queries to the database server 103, which searches the data tables 105 and returns the necessary data to the report generation application 102. The report generation application 102 formats the received data and inserts it into the report and optionally invokes the graphics generation application 104, which provides a graphical representation of the data in the report. Once all components of the report have been assembled, the newly generated report is provided to the client by web/application server 101 via the appropriate computer network.

FIGS. 2a and 2b illustrate an embodiment of the table structure of the database tables 105 shown in FIG. 1. Specifically, FIGS. 2a and 2b show exemplary data tables 105a and 105b containing patent information useful for purposes of generating patent data summaries. The exemplary table 105a contains one row per one issued patent. Each such row contains information on the patent number, filing date, issue date, assignee, attorney, class/subclass, etc. Table 105b contains information on the inventorship of the stored patents, and specifically the inventor name, inventor city and inventor state. It should be noted that other additional fields and additional tables may be used in for storing additional patent information. For example, the records in table 105a may (additionally or alternatively) contain data on patent applications as opposed to issued patents. The information records stored in tables in FIGS. 2a and 2b may be linked together using, for example, the patent number information in the first column of each table. The database server 103 enables flexible querying of the records stored in tables 105a and 105b using any of the data fields in those tables or any combinations thereof.

Conducting searches in most sources of patent data is problematic because of frequent misspellings of individual and/or entity names in the records. The term "entity" used herein shall refer to a patent assignee, attorney/agent, inventor, class/subclass, country, etc. For example, in the United States Patent and Trademark Office database the name of law firm Sughrue Mion PLLC (firm with the most patents issued in 2004) is spelled in the following ways: Sughrue Mion PLLC (10127 times); Sughrue Mion Zinn Macpeak Seas PLLC (94 times); Sughrue Mion LLP (18 times); Sughrue Mion Zinn MacPeak Seas LLP (13 times); Sughure Mion PLLC (8 times), etc.

If one were to search the records for Sughrue Mion PLLC, in order to get a complete list of associated patents, she would have to conduct multiple searches using all the above different spellings of the entity name. One aspect of the inventive method provides a way to select all database records, even those containing misspellings, attributable to a specific entity.

Figure 3A:
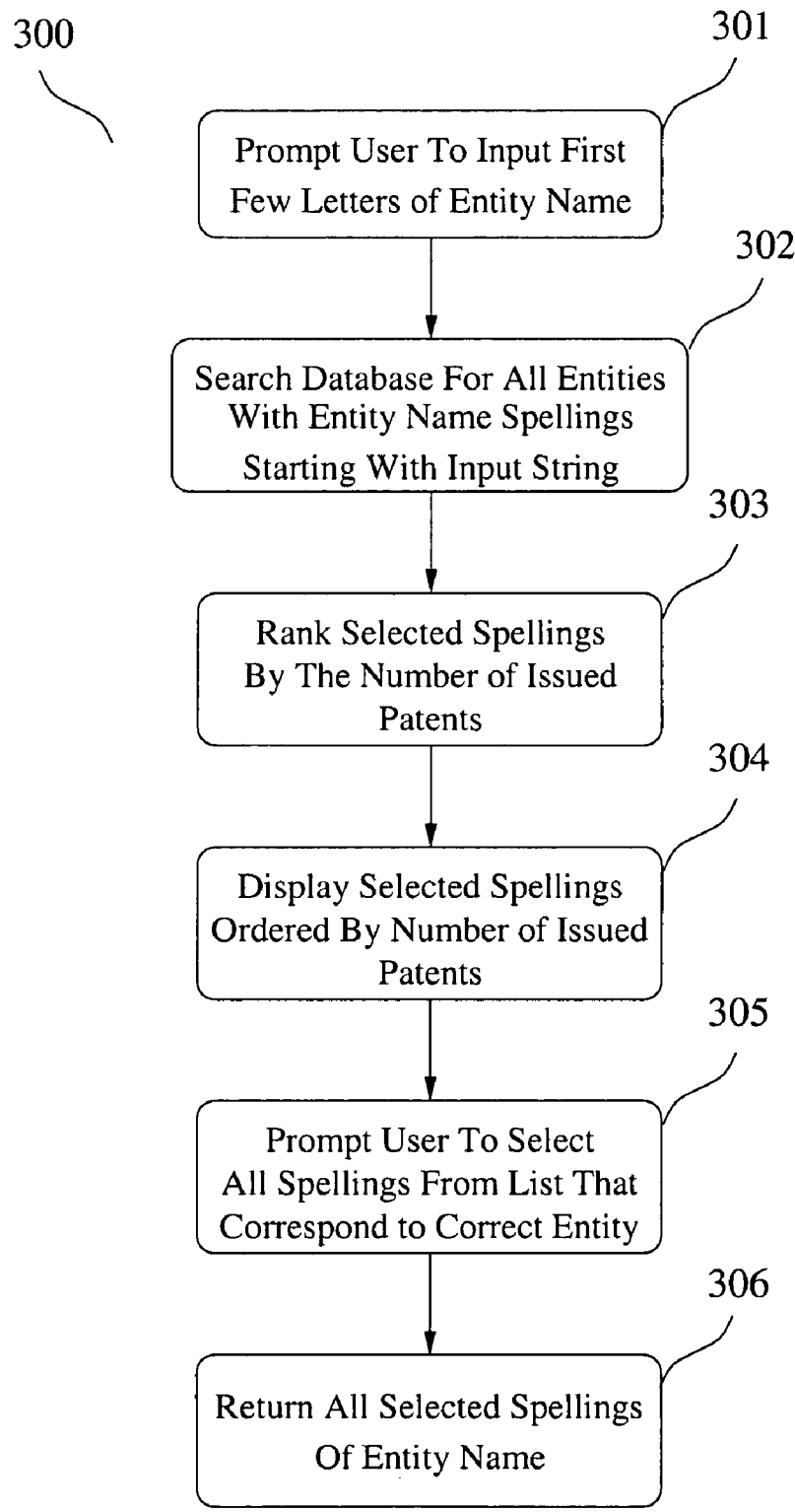
FIG. 3a illustrate an exemplary embodiment of an inventive algorithm for identifying proper entity.

FIG. 3a is an exemplary embodiment 300 of the inventive technique for selecting all spellings (correct and incorrect) of a target entity name. First, at step 301, the user is prompted to input first few letters of the entity name, see FIG. 3b. The number of the input letters may be adjusted depending on the size of the database and the number of the returned results. If, for example, a user inputs just two letters and the search returns a very large number of results, the system may ask the user to input additional letters.

After receiving the user's input, at step 302, the system conducts a search of all records in the database with the appropriate entity name starting with the string input by the user. For example, if the entity is an assignee, the system would search database table 105a shown in FIG. 2a, for all patents with an assignee name matching the user's input. After the search is complete, the system groups together the found records with the same spelling of the entity name (each separate group has a different spelling) and ranks the resultant groups based on the number of records within each such group, see step 303.

At step 304 the system displays to the user spellings corresponding to each group of records arranged in the order of decreasing number of records corresponding to each spelling, together with the corresponding occurrence numbers, see FIG. 3c. The user is then asked to select all spellings (and corresponding groups of records) that represent the intended target entity, see step 305 and FIG. 3c, the left-most column. Finally, the system returns all spellings of the name of the proper entity selected by the user for subsequent searching, see step 306.

Figure 4A:
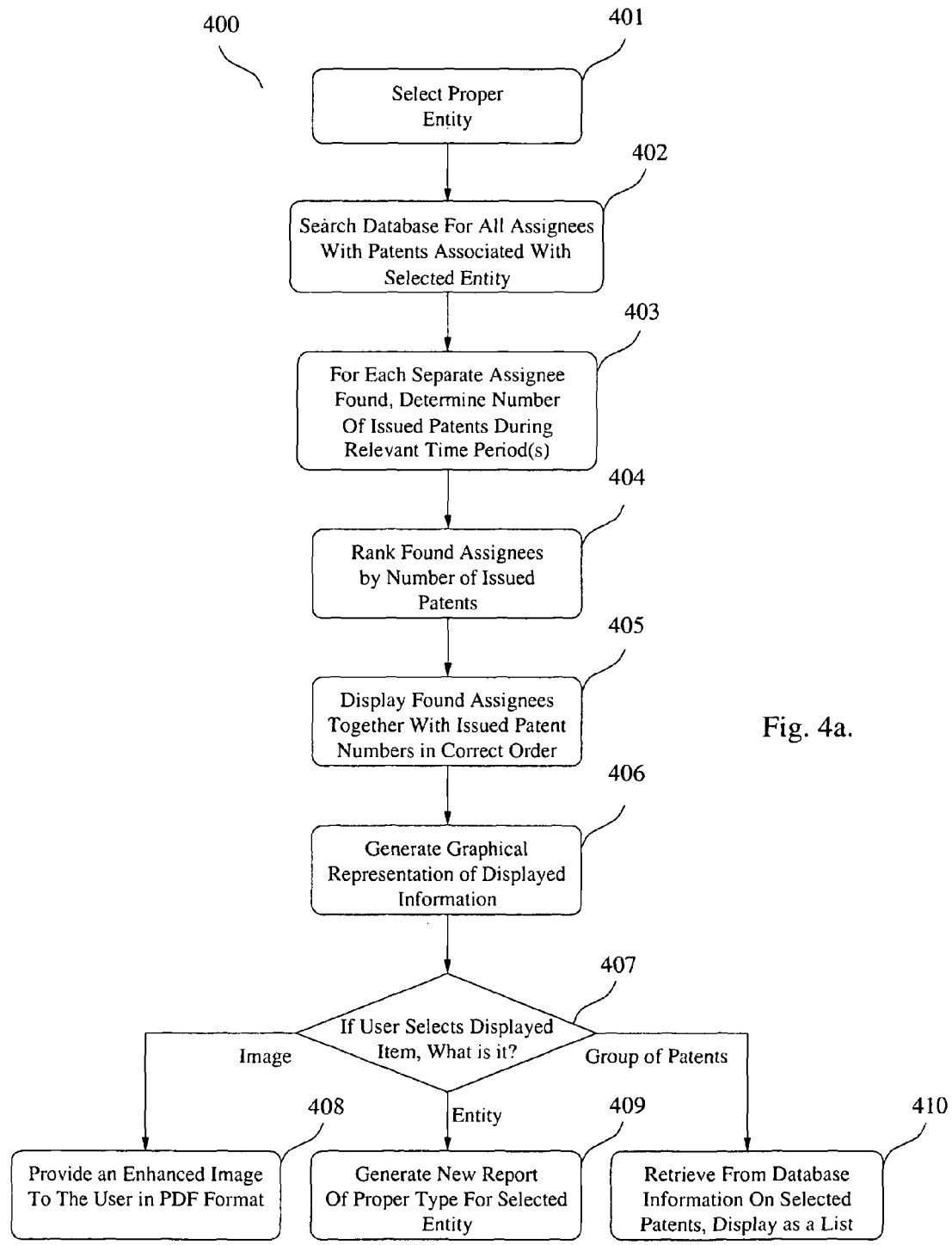
FIG. 4a illustrates an exemplary embodiment of an inventive patent data summaries generation algorithm.

Once the proper entity has been identified, the system proceeds with report generation. The report generation algorithms will now be described. FIG. 4a illustrates an exemplary embodiment of the algorithm for generating assignee report for a selected entity. The report contains all information on assignees of patents associated with that entity. For example, if the entity is a law firm, the assignee report would show all assignees of the patents prosecuted by that law firm, e.g. all the clients of that law firm. If the entity is a class/subclass the assignee report would show all companies that obtained patents in the specific field of technology represented by the selected patent class/subclass.

With reference to FIG. 4a, at step 401 the user selects a proper entity. For example, the algorithm shown in FIG. 3a may be utilized for this purpose. Once all the spellings of the entity name are identified at step 401, the system conducts a search of all database records for assignees of patents associated with the selected entity. In one embodiment, the search uses multiple spellings of the entity name.

The search at step 402 returns a list of all assignees with patents associated with the selected entity. At step 403, for each separate assignee found, the system determines the number of patents issued during a relevant time period associated with that assignee. After that, at step 404, the various assignees are ranked based on the numbers of such issued patents. For example, the assignees may be ranked based on the number of patents issued to assignee in the entire previous year, or during the current year.

At step 405, the found assignees are displayed to the user in a ranked order together with the numbers of issued patents associated with each displayed assignee. An exemplary assignee listing is shown in FIG. 4b. At step 406, the system generates a graphical representation of the displayed assignee list, an example of which is also shown in FIG. 4b.

In an embodiment of the invention, the report displayed at steps 405 and 406 is interactive, in a sense that a user can select an item from the report and the inventive system would respond to user's selection by either providing another report specific to the selected entity, group of patents, or return to the user an enhanced image. To this end, the process illustrated in FIG. 4 includes a step 407, whereupon the system determines whether the user selected an item from the report and, if so, the nature of the selected item. The user interaction capability may be implemented using, for, example hyperlinks within the report pointing to appropriate scripts located in the area accessible to the web server 101. An example of such a user interaction would be a situation when a user clicks on the name of an assignee listed in the assignee report described above and the system would generate another report on all law firms doing work for the selected assignee.

Once the nature of the selected report item has been determined at step 407, the system proceeds forward, depending on what was selected. In an embodiment of the invention, if a user selected an image in the report, the system simply offers the user to download an enhanced version of the same image, step 408. If a user selected an entity such as an assignee or a law firm, the system proceeds with generating and displaying to the user another appropriate report for the selected entity, step 409. The new report may be a law firm report, a class/subclass report, an inventor report, etc.

If a user clicks upon, or otherwise selects a number in the report representing a number of patents in a group of patents, the system would retrieve all the selected patents from the database 105 and display the patents to the user as a list, see step 410. The user is then capable of selecting the displayed patents to view their particulars. In another embodiment of the invention, the user is provided with a link to the appropriate patent in the U.S. Patent and Trademark Office database and/or website.

In an exemplary assignee report is shown in FIG. 4b, the information is provided to the user in a tabular format and includes optional graphical representation in form of a bar-type chart. With reference to FIG. 4b, the first column of the table lists rank of various assignees based on the number of patents issued during a specific time period, for example during the previous full year. The second column lists corresponding assignee name. Columns three, four and five provide information on the numbers of issued patents to the assignee during predetermined time intervals, for example, the previous several years. Sixth, seventh, eights and ninth columns provide information on relative changes in the numbers of issued patents during the relevant time periods. For example, the sixth column gives the relative change in the issued patent numbers during the previous two years. The information displayed in the table is interactive in the sense that if a user were to click on, or otherwise select items from appropriate columns of the report table, the system would provide a user with more information on the selected item. Specifically, in the exemplary report shown in FIG. 4b, if a user selects a name of the assignee, the system would provide a user with a separate report on the patents associated with such an assignee, such as report shown in FIG. 5b. If a user were to select a number displayed in the columns three, four or five, representing the numbers of issued patents, the system would provide the user with a list of all the patents in the selected group. The report shown in FIG. 4b additionally includes graphics representing various assignees shown in the table and the issued patent numbers corresponding to those assignees during different time periods. The patent number information for different time periods may be shown in different colors on the chart, for example, all 2004 patent data would be shown in red, all 2003—in blue, etc. Alternatively, patent data for different assignees may be also color-coded, with each assignee being assigned a separate color. The report may also contain summary patent statistics during relevant times, such as total numbers of patents issued.

Figure 5A:
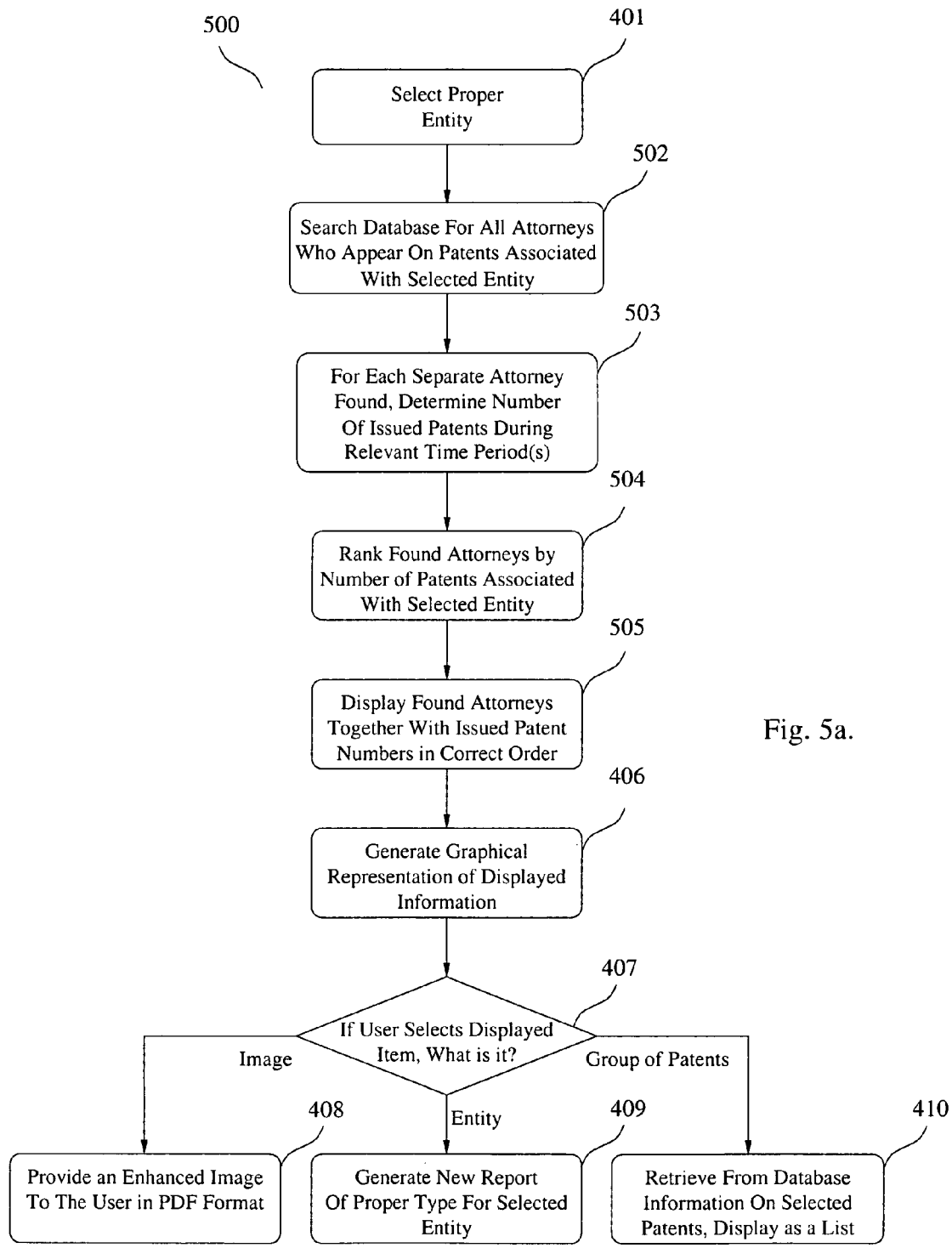
FIG. 5a illustrates another exemplary embodiment of an inventive patent data summaries generation algorithm.

FIG. 5a illustrates an exemplary embodiment of the attorney/agent report generation algorithm. By analogy to the assignee report of FIG. 4b, the attorney/agent report lists all attorney/agents, which prosecuted issued patent(s) associated with a selected entity. For example, if the selected entity is an assignee, the attorney/agent report will show all law firms that prosecuted patent(s) for that assignee. The steps of the algorithm shown in FIG. 5a are in many respects analogous to corresponding steps of the one shown in FIG. 4a. Specifically, at step 401, the proper entity is selected. At step 502 the system searches the database for all attorneys who appear on patents associated with the selected entity. At step 503, for each separate attorney found, the system determines the number of patents issued during a relevant time period. Then, at step 504, the inventive system ranks attorneys by the number of patents associated with the selected entity. The results are displayed at step 505. A sample attorney/agent report is shown in FIG. 5b. This report is generally similar to the report shown in FIG. 4b, but instead of the assignee information, the attorney/agent data is displayed.

Optionally, graphical representation of the displayed data may be obtained at step 406. The graphical representation shown in FIG. 5b is generally similar to the graphics in FIG. 4b. The handling of the user's selection of items from the report is accomplished at steps 407-410, is described in detail above. For example, if a user selects an attorney/agent from the report of FIG. 5b, the system would provide the user with the detailed report on the selected attorney/agent, which may be similar to the report shown in FIG. 4b, etc. As the report shown in FIG. 4b, the attorney/agent report of FIG. 5b may include patent data summary information.

Figure 6A:
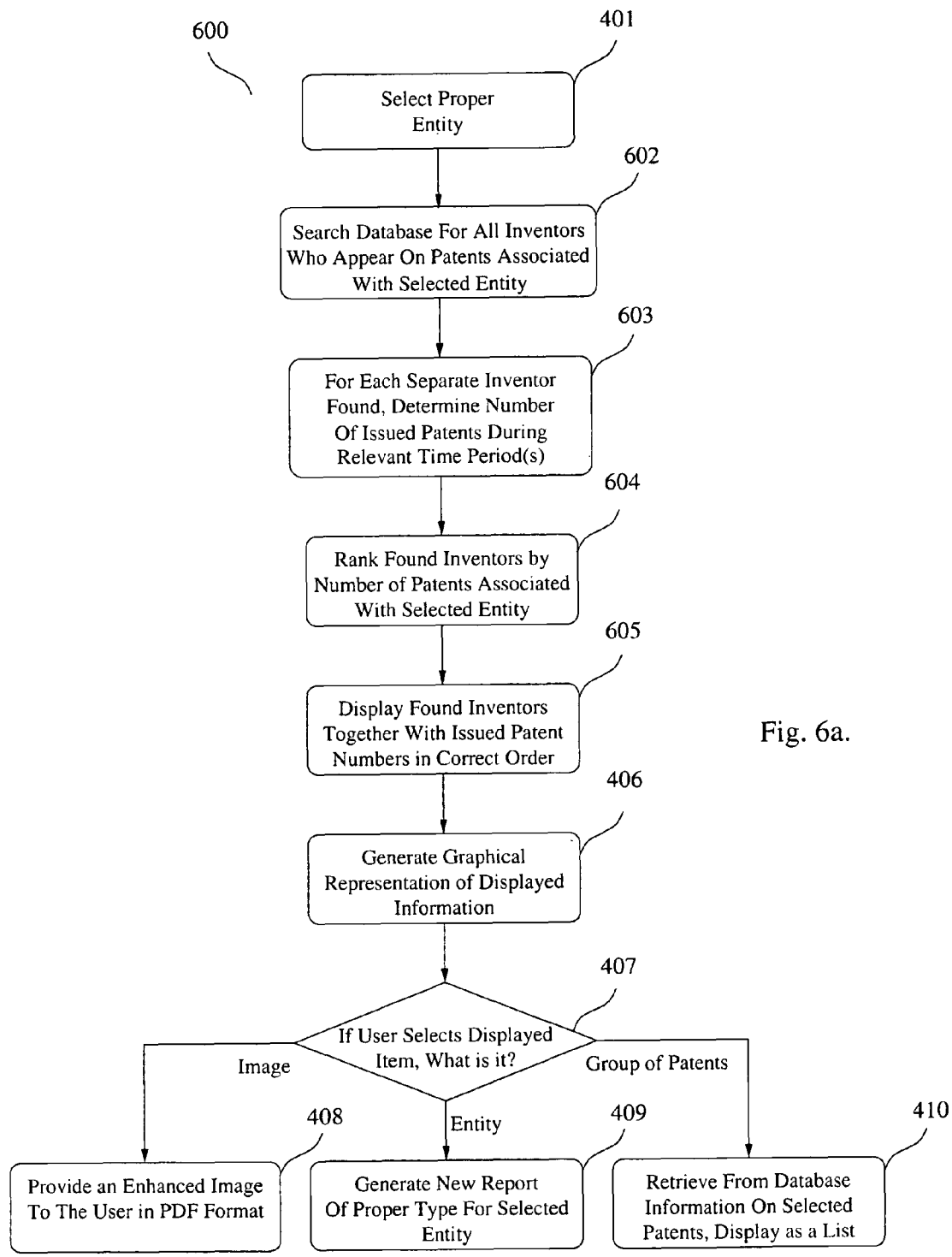
FIG. 6a illustrates yet another exemplary embodiment of an inventive patent data summaries generation algorithm.
Figure 7A:
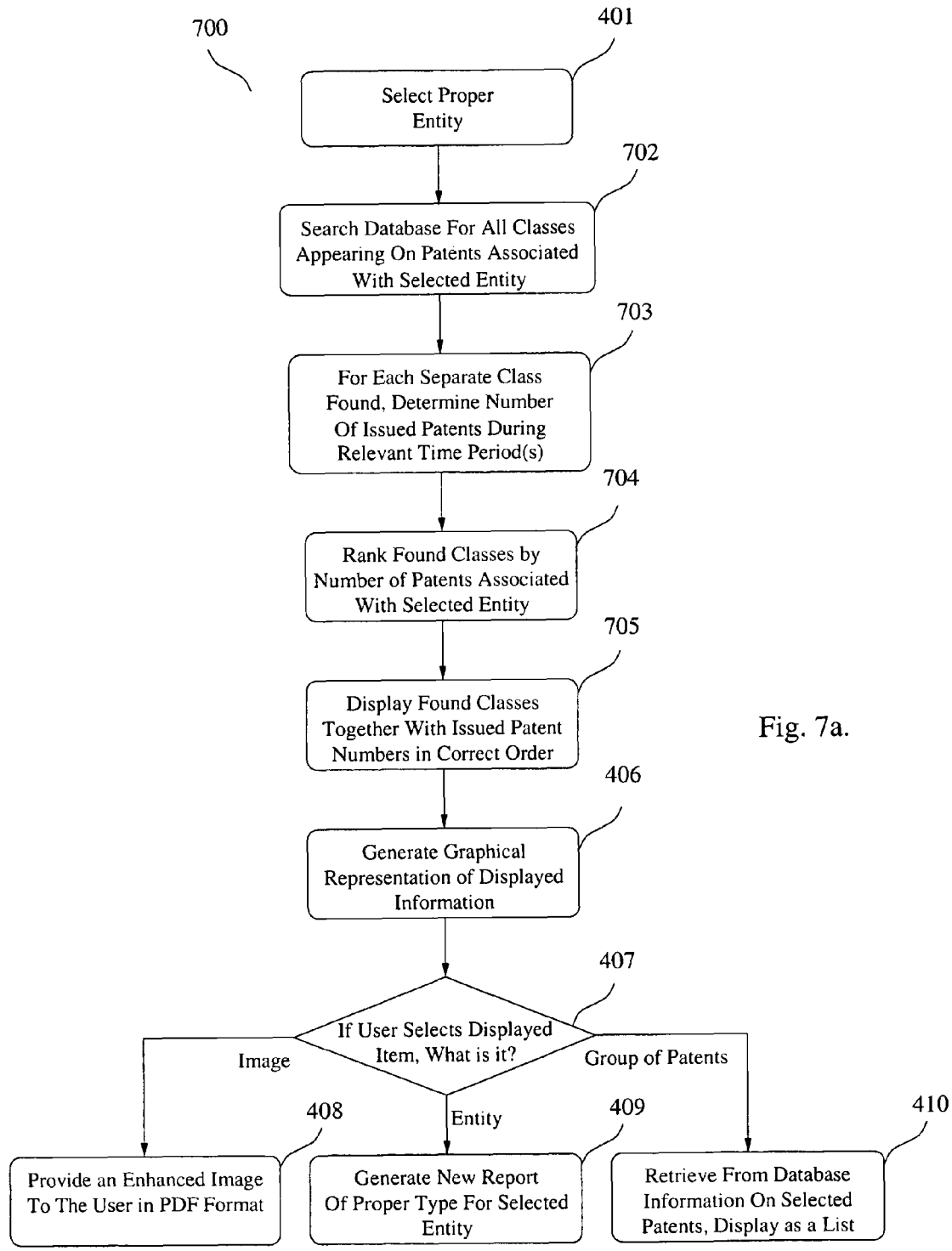
FIG. 7a illustrates yet another exemplary embodiment of an inventive patent data summaries generation algorithm.

FIGS. 6a and 7a depict exemplary algorithms for generating an inventor report and a class/subclass report. The inventor report may be used to identify top inventors within, for example, a specific company. The top inventor information may be very valuable, for example, to headhunters for recruiting purposes.

The steps of the algorithms for generating inventor and class/subclass reports are generally equivalent to the corresponding steps of the algorithms shown in FIGS. 4 and 5 and described above. Specifically, at step 401, the proper entities (e.g. companies or assignees) are designated by the user, as described above. At steps 602 and 702, the system searches the database for all inventor records and class/subclass records in the patents associated with the entity specified by the user. At steps 603 and 703, the system determines the number of patents corresponding to each separate inventor or class/subclass. At steps 604 and 704 the system ranks inventors or classes/subclasses based on the number of respective patents. At steps 605 and 705 the inventor or class/subclass information is displayed together with the rank information and patent number information in the correct order to the user. Optionally, graphical representation of the displayed data may be obtained at step 406. The handling of the user's selection of items from the report is accomplished at steps 407-410, as described in detail above.

Sample inventor and class/subclass reports are shown in FIGS. 6b and 7b, respectively. The exemplary inventor report shown in FIG. 6b is presented to the user in a table format, with each row corresponding a different inventor. The first column in the table is the rank of the inventor based on the number of issued patents by the inventor. The second, third, forth and fifth columns represent the name of the inventor as well as the city, state and country of inventor's residence, respectively. The number in the sixth column represents the number of patents issued to inventor during a predetermined time period, for example the last 3 years.

In an embodiment of the invention, the sixth column of the table contains a link to the list of issued patens by the corresponding inventor. In other words, is a user of the system were to select, for example, number "3" in the first row, fifth column, the user would be taken to a page listing all 3 patents by the first listed inventor. The user may further select one of the listed patents and be provided with additional information on that specific patent.

In another embodiment of the invention, a user may select the inventor name in the second column of the table and be directed to a page listing inventor's contact information, including inventor's address and/or phone number. Such information may be provided by one of the well-known directory services, such as Google, smartpages.com, etc. To this end, the inventive information system may pass the inventor information to the directory service, which, in turn, would provide the contact information for the inventor for display to the user.

The exemplary class/subclass report shown in FIG. 7b includes patent class information associated with specific entity. The second column of the table contains the class number with an optional link to class definition and/or description. The third, fourth and fifth columns contain information on the numbers of patents in the corresponding class issued during predetermined time periods. The sixth, seventh, eights and ninth columns contain information on the changes of the patent numbers with time. As with the inventor report of FIG. 6b, a user may select a number from the class/subclass report representing a group of patents (columns three, four and five) and be directed to a page listing the corresponding patents and/or providing additional relevant information on the selected group.

In another embodiment of the invention, a system generates a country report showing data on countries of assignees of patents associated with specific entity. For example, if such an entity is a law firm, the country report would show in which countries the clients of that law firm reside. This report is generated in similar way to the reports described in detail above.

As may be appreciated by those of skill in the art, various types of reports may be provided in a combination for a specific entity. For example, if a user selects a specific assignee, the system may provide an attorney/agent report, a class/subclass report and inventor report for that assignee. In an embodiment of the invention, the user may make a selection of which reports he or she wishes to see prior to the report generation.

If a user selects an attorney/agent, the system may provide a country report, an assignee report and class/subclass report corresponding to that attorney/agent. If a user selects a country, the system may provide an attorney/agent report and assignee report for that specific country. As will be appreciated by those of skill in the art, may other combinations of reports are possible.

In an embodiment of the invention, the inventive system is provided with an update application operating on the server platform 100, which periodically downloads updates to the patent data stored in the database tables 105 and installs those updates using the database server application 103. The updates may be downloaded from Internet using an FTP or HTTP client application at the direction of the update application. The update application may be automatically invoked, for example once a week, using well-known scheduling facilities of operation systems, such as CRON utility of Unix-type operating systems.

Figure 8:
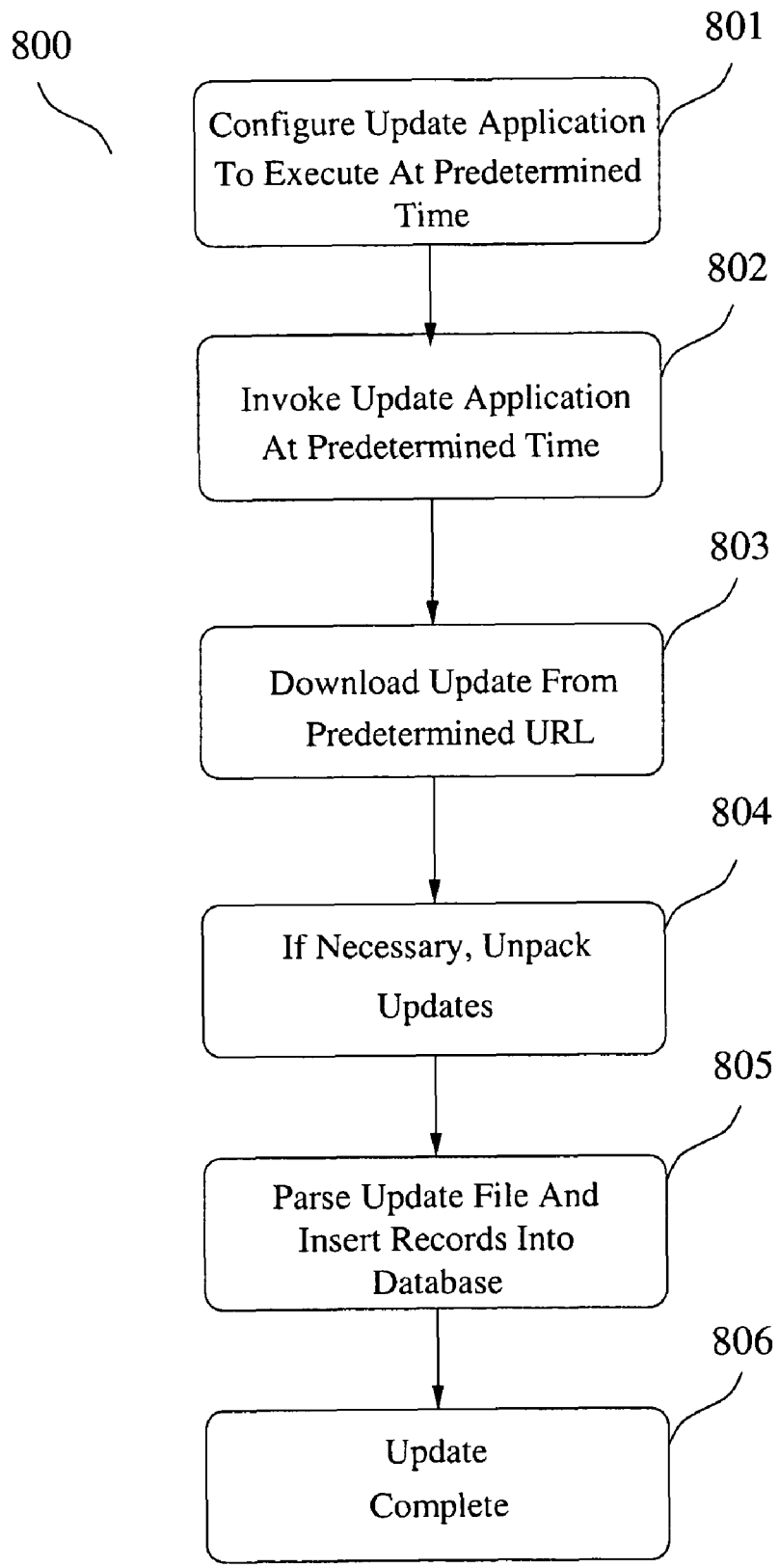
FIG. 8 illustrates an exemplary embodiment of an inventive patent data update algorithm.

FIG. 8 illustrates the operation of the database update application. At step 801, the application may be configured to automatically execute at predetermined times using cron utility of Unix-type operation systems, or task scheduling facility of Windows-based OS. The application is also configured with the Internet location (URL) and name of the resource to be downloaded. The name of the resource may need to be re-generated for every download. At step 802, the update application is invoked at a predetermined time.

At step 803, the update application uses FTP or HTTP client to download an update from a predetermined Internet location defined by the appropriate URL. If the update data were previously compacted or encoded, tt step 804, the application unpacks and/or decodes the update, making it ready for installation.

At step 805, the update application parses the update file(s) and inserts proper records into the inventive system's database, after which it terminates the execution until the next scheduled run time, step 806.

Additionally, the inventive system may include a logging function which records the reports requested by each user and stores the requested report information in the database comprised of data tables 105. This facilitates the accurate recording of the usage of the system by various users for purposes of studying system use patterns and generating billing records. As may be appreciated by those of skill in the art, the system may provide an authentication mechanism for the users in order to identify authorized users of the system to ensure accuracy of usage recording and billing generation.

Yet additionally, the system may implement report caching by pre-generating various reports, in whole or in part, in advance for a specific number of predetermined entities and then provide the pre-generated reports on the entity when user makes an appropriate request. For example, the system may use its idle time (when the system does not received any user's requests) to generate reports for each of the top (in terms of numbers of issued patents) companies or law firms. When the user requests a report on a specific law firm, the system would immediately provide the user with the requested report without having to re-generate the report in real time. In another embodiment, before providing the so pre-generated to the user, the system would check if any data in the report changed, and, if so, appropriately update the report by re-generating the report in whole or in part. In one embodiment of the invention, only the changed part of the report is updated. In one embodiment of the invention, the system keeps track of frequency of report usage and pre-generates first the reports most frequently used.

As may be appreciated by those of skill in the art, the reports may be generated in various formats, including HTML, XML, PDF, JPG, GIF, etc., and be delivered to the user using a variety of network communication protocols, including HTTP, FTP, SMTP, etc. Also, depending on the database management system utilized, as well as efficiency considerations, various steps of the algorithms described above may be combined together or split apart. For example, the step 502 in FIG. 5*a* may be programmed as two steps, with first step identifying all patents associated with the selected entity (first association type, for example assignee of a patent) and the second step identifying all attorneys who prosecuted the found patents (second association type).

Figure 9:
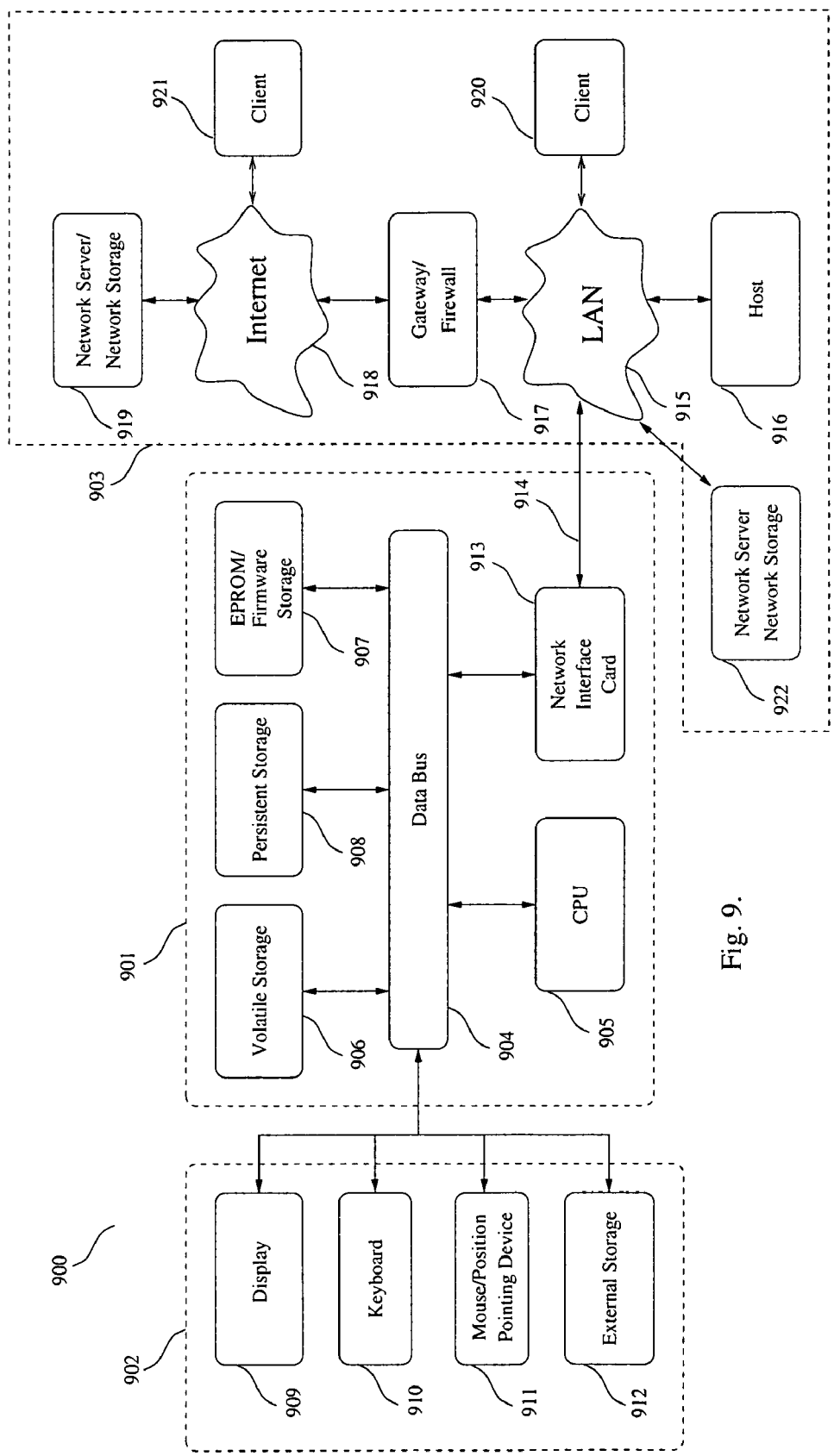
FIG. 9 illustrates an exemplary embodiment of an inventive computerized information system.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, client-side 106/107 and/or server-side 100 may reside on a machine such as computer platform 901. In an embodiment, database 103/105 may be deployed on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques (e.g., methods 300-800) described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radiowave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 806, from which processor 905 retrieves and executes the instructions. The instructions received by the volatile memory 906 may optionally be stored on persistent storage device 808 either before or after execution by processor 805. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized information system for generating patent data summaries. It is intended that the specification and examples be considered as exemplary only, with a true scope and spirit of the invention being indicated by the following claims.

What is claimed is:

1. A computer-implemented method for generating an interactive patent data summary report, the interactive report comprising data for each of a plurality of years on a target law firm entity, the method comprising:

a. receiving first information, wherein the first information is indicative of the target law firm entity, wherein the target law firm entity is of a first entity type;

b. using one or more processors to issue one or more database system queries, at least one of the one or more queries comprising at least a portion of the first information to a database system comprising at least one database table stored on a computer readable medium to identify a plurality of company entity records, the plurality of company entity records being a subset of all company entity records stored in the at least one database table and comprising information on a plurality of company entities being assignees of at least one of a plurality of patent documents, wherein the target law firm entity being an attorney listed on each of the plurality of patent documents, each of the plurality of company entities being of a second entity type and wherein the subset of the stored all company entity records constituting the plurality of company entity records is determined using the issued one or more database system queries;

c. using the one or more processors for extracting the information on the plurality of company entities from the plurality of company entity records;

d. incorporating using the one or more processors the extracted information on at least two of the plurality of company entities of the second entity type into the interactive report;

e. using the one or more processors for determining, for each pair comprising a year from the plurality of years and a company entity from at least two of the plurality of company entities, a quantity of patent documents in the plurality of patent documents corresponding to the pair, each of the plurality of patent documents listing the target law firm entity as an attorney;

f. generating using the one or more processors a graphical chart, the graphical chart incorporating, for each pair comprising the year of the plurality of years and the company entity from the at least two of the plurality of company entities, a graphical representation of the determined quantity of patent documents;

g. incorporating using the one or more processors the generated graphical chart into the interactive report or associating the graphical chart with the interactive report; and h. causing the interactive report to be provided to the user, wherein the interactive report comprises a user interface portion usable in connection with a web browser;

wherein the interactive report comprises a plurality of information items capable of being activated by the user, the plurality of information items forming the user interface portion of the interactive report; and wherein receipt of an indication that at least one information item of the plurality of information items of the user interface portion of the interactive report has been activated by the user causes the one or more processors to generate a second report based on the activated information item and cause the second report to be provided to the user.

2. The computer-implemented method of claim 1, wherein the first information comprises at least a portion of a name of the law firm entity.

3. The computer-implemented method of claim 2, further comprising identifying the target law firm entity based on the first information.

4. The computer-implemented method of claim 3, wherein the identifying the target law firm entity comprises:

i. identifying records using the database system using at least a portion of the received first information, the identified records representing one or more possible spellings of a name of the law firm entity;

ii. ranking the identified records based on a number of patent documents corresponding to each spelling of the name of the law firm entity;

iii. providing the identified records to the user in a ranked order;

iv. receiving second information from a user via a computer network, wherein the second information identifies the law firm entity and wherein the second information comprises selection of the identified records, the selected identified records representing different spellings of the name of the law firm entity, which correspond to the law firm entity.

5. The computer-implemented method of claim 1, wherein the first entity type is attorney/agent and the second entity type is assignee.

6. The computer-implemented method of claim 1, wherein the graphical chart comprises a bar chart.

7. The computer-implemented method of claim 1, wherein the interactive report comprises HTML code and is provided to a user via HTTP protocol.

8. The computer-implemented method of claim 1, further comprising associating a link element with an information item in the interactive report, wherein upon activation of the link element, the user is provided with the second report on the information item.

9. The computer-implemented method of claim 8, wherein the information item represents a number of patent documents and the second report comprises a listing of the patent documents.

10. The computer-implemented method of claim 8, wherein the information item is selected from a group consisting of an attorney/agent, assignee, class/subclass, assignee country and inventor.

11. The computer-implemented method of claim 1, wherein the interactive report comprises a name of the target law firm entity, a name of at least one of the plurality of company entities and information on the patent documents associated with target law firm entity and the plurality of company entities.

12. The computer-implemented method of claim 1, wherein the plurality of company entities are listed in the interactive report in a ranked manner in accordance with corresponding quantities of patent documents in the plurality of patent documents.

13. The computer-implemented method of claim 1, further comprising periodically updating records stored in the at least one database table.

14. The computer-implemented method of claim 1, wherein the report comprises at least two numbers of patent documents in the plurality of patent documents for at least two the plurality of company entities.

15. A computer-implemented method for generating an interactive patent data summary report, the interactive report comprising data for each of a plurality of years on a target company entity, the method comprising:

a. receiving first information, wherein the first information is indicative of the target company entity, wherein the company entity is of a first entity type;

b. using one or more processors to issue one or more database system queries, at least one of the one or more queries comprising at least a portion of the first information to a database system comprising at least one database table stored on a computer readable medium to identify a plurality of law firm entity records, the plurality of law firm entity records being a subset of all law firm entity records stored in the at least one database table and comprising information on a plurality of law firm entities being listed as attorney of record on one or more of a plurality of patent documents, wherein the target company entity being an assignee of each of the plurality of patent documents, each of the plurality of law firm entities being of a second entity type and wherein the subset of the stored all law firm entity records constituting the plurality of law firm entity records is determined using the issued one or more database system queries;

c. using the one or more processors for extracting the information on the plurality of law firm entities from the plurality of law firm entity records;

d. incorporating using the one or more processors the extracted information on at least two of the plurality of law firm entities of the second entity type into the interactive report;

e. using the one or more processors for determining, for each pair comprising a year from the plurality of years and a law firm entity from at least two of the plurality of law firm entities, a quantity of patent documents in the plurality of patent documents corresponding to the pair, each of the plurality of patent documents listing the target company entity as an assignee;

f. generating using the one or more processors a graphical chart, the graphical chart incorporating, for each pair comprising the year of the plurality of years and the law firm entity from the at least two of the plurality of law firm entities, a graphical representation of the determined quantity of patent documents;

g. incorporating using the one or more processors the graphical chart into the interactive report or associating the graph with the interactive report; and h. cause the interactive report to be provided to the user, wherein the interactive report comprises a user interface portion usable in connection with a web browser;

wherein the interactive report comprises a plurality of information items capable of being activated by the user, the plurality of information items forming the user interface portion of the interactive report; and wherein receipt of an indication that at least one information item of the plurality of information items of the user interface portion of the interactive report has been activated by the user causes the one or more processors to generate a second report based on the activated information item and cause the second report to be provided to the user.

16. A computerized information system for generating an interactive patent data summary report, the interactive report comprising data for each of a plurality of years on a target company entity, the computer system comprising:

a. a database system, wherein the database system comprises at least one table stored on a computer readable medium for storing database records and wherein the database records comprise patent document records;

b. a processing unit for receiving instructions from the user, for processing received instructions and for generating the interactive report on the target company entity;

c. a storage unit for storing a computer program for generating the interactive report on the target company entity, wherein the computer program causes the processing unit to:

i. receive first information, wherein the first information is indicative of the target company entity, wherein the company entity is of a first entity type;

ii. use one or more processors to issue one or more database system queries, at least one of the one or more queries comprising at least a portion of the first information to a database system comprising at least one database table stored on a computer readable medium to identify a plurality of law firm entity records comprising information on a plurality of law firm entities being listed as attorney of record on one or more of a plurality of patent documents, wherein the target company entity being an assignee of each of the plurality of patent documents, each of the plurality of law firm entities being of a second entity type;

iii. extract the information on the plurality of law firm entities from the plurality of law firm entity records;

iv. incorporate using the one or more processors the extracted information on at least two of the plurality of law firm entities of the second entity type into the interactive report;

v. determine a plurality of numbers of patent documents, each number in the plurality of numbers of patent documents being a number of patent documents in the plurality of patent documents corresponding to a pair comprising a year from the plurality of years and a law firm entity from at least two of the plurality of law firm entities;

vi. generate using the one or more processors a graphical chart, the graphical chart incorporating, for each year of the plurality of years and for each of the at least two of the plurality of law firm entities, a graphical representation of each of the determined plurality of numbers of patent documents;

vii. incorporate using the one or more processors the graphical chart into the interactive report or associating the graphical chart with the interactive report; and viii. cause the interactive report to be provided to the user, wherein the interactive report comprises a user interface portion usable in connection with a web browser;

wherein the interactive report comprises a plurality of information items capable of being activated by the user, the plurality of information items forming the user interface portion of the interactive report; and wherein receipt of an indication that at least one information item of the plurality of information items of the user interface portion of the interactive report has been activated by the user causes the one or more processors to generate a second report based on the activated information item and cause the second report to be provided to the user.

17. The computerized information system of claim 16, wherein the database system comprises a first table storing patent document information and a second table storing inventor information.

18. The computerized information system of claim 16, wherein the computer program further causes the processing unit to associate a link element with an information item in the interactive report, wherein upon activation of the link element, the user is provided with a second report on the information item.

19. The computerized information system of claim 18, wherein the information item represents a quantity of patent documents and the second report comprises a listing of the patent documents.

20. The computerized information system of claim 18, wherein the information item is selected from a group consisting of an attorney/agent, assignee, class/subclass, assignee country and inventor.

* * * * *